(12) United States Patent
Baldwin et al.

(10) Patent No.: US 7,107,456 B2
(45) Date of Patent: Sep. 12, 2006

(54) PACKAGING EVIDENCE FOR LONG TERM VALIDATION

(75) Inventors: Adrian Baldwin, Bristol (GB); Simon Shiu, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 836 days.

(21) Appl. No.: 10/164,039

(22) Filed: Jun. 4, 2002

(65) Prior Publication Data

US 2003/0233552 A1    Dec. 18, 2003

(30) Foreign Application Priority Data

Jun. 4, 2001 (GB) ............................ 0113572.2

(51) Int. Cl.
*G06F 1/26* (2006.01)
(52) U.S. Cl. ............... 713/182; 713/176; 713/178; 713/169; 713/155; 713/156; 713/158; 713/161
(58) Field of Classification Search ......... 713/182, 713/178, 176, 169, 155, 156, 158, 161
See application file for complete search history.

(56) References Cited

U.S. PATENT DOCUMENTS 5,479,509 A * 12/1995 Ugon ............... 713/176
5,629,982 A * 5/1997 Micali ............ 380/30
5,724,425 A * 3/1998 Chang et al. .......... 705/52

FOREIGN PATENT DOCUMENTS

| EP | 0892521 A2 | 1/1999 |
|---|---|---|
| WO | WO97/12460 | 4/1997 |
| WO | WO98/02968 | 1/1998 |
| WO | WO 99/57847 | 11/1999 |
| WO | WO01/41360 | 6/2001 |
| WO | WO01/89133 | 11/2001 |

OTHER PUBLICATIONS

PKCS#7: Cryptographic Message Syntax Standard, RSA Laboratories, An RSA Laboratories TEchnical Note, Version 1.5, Revised Nov. 1, 1994, pp. 1-30.

* cited by examiner

*Primary Examiner*—Thomas R. Peeso

(57) ABSTRACT

A method for packaging digital evidence for long term validation comprises forming a package of a digital document (10), an electronic signature (12) for the document (10), together with evidence (16) of the authority of the signature in the document and a time stamp (20) indicating when the document was digitally signed. All of the pieces form parts of the packaged evidence.

25 Claims, 1 Drawing Sheet

PACKAGING EVIDENCE FOR LONG TERM VALIDATION

TECHNICAL FIELD

This invention relates to a method of packaging digital evidence for long term validation and to a system for the packaging of digital evidence for long term validation.

BACKGROUND OF THE INVENTION

It is well known to make use of public key cryptography to validate digital documents as originating from a particular user having access to related public and private keys. The same system can be used to allow only that user to access a document encoded with the public key. The use of public key cryptography is typically implemented by use of digital certificates. A digital certificate may be issued by a certification authority (CA) which checks the credentials or personal information/financial information (whatever information is particularly relevant) before issuing a certificate to that user. The certificate may then be provided to reliers or third parties to authenticate that the user is who they say they are. The relier takes it on trust that the CA has conducted whatever checks are necessary to issue the user with the certificate. Chains of certificates may be produced whereby a root CA issues a certificate to a second CA to certify that the second CA is trusted by the root CA. The second CA may then issue a certificate to a third CA on the basis that the third CA is trusted by the second CA. The third CA may then issue a certificate to a user, who may use the certificate with an independent party who trusts the validity of the certificate on the basis that the root authority is trusted and the relationships which the root authority keeps are also trusted.

Documents such as emails can be digitally signed by use of public key cryptography when a user encrypts a signature for an email using his private key. A third party can authenticate that signature by decrypting the signature with the public key.

A problem exists of how to package and maintain a digitally signed document as evidence which can be interpreted at a later date, for example in a court of law. Typically, a document retention period may be seven years, although at present a CA will not necessarily retain certification information for that period of time. An existing CA called VeriSign keeps different levels of certificates. VeriSign's level 2 and level 3 certificates are retained for five years. A CA such as VeriSign will only keep certification details, rather than any document which has been signed with a certificate issued by the CA. Furthermore, by making use of the reliance on the CA in the way described above disadvantages are found because reliance is placed on an outside party to prove the validity and meaning of signatures at later dates.

SUMMARY OF THE INVENTION

According to a first aspect of the present invention a method of packaging digital evidence from a signatory for long term validation by a relier comprises:
a third party independent from the signatory and the relier assembling a package for potential subsequent validation, said package comprising:
  a document for subsequent use;
  a digital or electronic signature for said document;
  a public key associated with the signature, for decryption thereof;
  evidence from a certification authority (CA) of the identity or authority of the signatory of the document;
  a time authentication for at least the document and the signature; and
  evidence from a time authentication authority validating the or each time authentication;
the method also further comprising making the contents of the package available for verification; and
making the package available for storage for subsequent potential use.

The package may optionally then be verified by a fourth party, a verification client, which the relier may use to verify the package contents before storage.

The production of the package described advantageously produces self-contained evidence of the document having been signed by a verifiable party and at a verifiable time, for subsequent use.

The evidence is preferably packaged whilst a certificate covering the digital or electronic signature is valid. The method may include validation of digital evidence after expiry of a certificate covering said digital or electronic signature. The method may include the contents of the package being verified before expiry of a certificate covering said digital or electronic signature.

The method advantageously allows a package to be stored for validation of a certificate covering the digital signature after expiry of the certificate. Thus, although a certificate may be valid whilst the package is assembled and verified, the certificate may expire before validation is required. The fact that the package was verified during validity of the certificate is sufficient to allow validation at a later stage.

The time authentication may be a time stamp.

The document may be a contract or other document required to validate a transaction at a later date.

The evidence from the CA and/or the evidence from the time authentication authority may optionally be included in the form of a reference to a location of that evidence, said location preferably being in a data store in which the package is stored.

This provides the advantageous option that a signatory and a relier wishing to store the package for subsequent potential use may negotiate over which parts of a package the relier may require to be in the package and which parts may be incorporated by reference.

The evidence from a CA may include a certificate chain up to a trusted root CA. A certificate revocation list (CRL) may also be included. A policy statement for the certificate or each certificate in the chain may also be provided.

The certificate chain thereby extends up to a trusted root CA, who the user is willing to rely on to verify the source of the certificate chain.

The evidence from the time authentication authority may include a chain of authorities up to a root time authentication authority. A CRL for the time authentications may also be included. A policy statement for the or each CA or time authentication authority may also be included.

The time authentication chain is thereby verifiable up to a trusted root time authentication authority. Also the time authentication can be verified using the policy statement, without recourse to the authority concerned.

The time authentication may be performed as one time authentication on the package as a whole. In this way the package is advantageously complete, given that all the evidence needed is authenticated at the same time.

The time authentication may be performed on the specified items in the package individually. In this way regular use of a time authentication service could allow multiple production of the required time authentications for different packages, rather than having to obtain a single time authentication each time one is required.

A time authentication may also be provided for the evidence from the CA.

The package may be stored in a data store, which is preferably located on a computer. The document and/or certificate is preferably in the form of a computer file.

According to a second aspect of the present invention a method of packaging digital evidence for long term validation comprises:

assembling a package for subsequent validation, said packaging comprising:
a document for subsequent use;
a digital or electronic signature for said document;
a public key associated with the signature, for decryption thereof;
evidence or a reference to an address of evidence from a certification authority (CA) of the identity or authority of the signatory of the document;
a time authentication for at least the document and the signature;
and evidence or a reference to an address of evidence from a time authentication authority validating the or each time authentication;
the method further comprising verifying the contents of the package; and
storing the package for subsequent potential use, wherein the assembly of the package is carried out by a third party independent from the signatory and a relier.

According to a third aspect of the present invention apparatus for the packaging of digital evidence for long term validation comprises:

a first computer programmed to assemble a package for subsequent validation, said package comprising:
a document for subsequent use;
a digital or electronic signature for said document;
a public key associated with the signature, for decryption thereof;
evidence or a reference to an address of evidence from a certification authority (CA) of the identity or authority of the signatory of the document;
a time authentication for at least the document and the signature;
and evidence or a reference to an address of evidence from a time authentication authority validating the or each time authentication; and
the apparatus further comprising a second computer programmed to verify the contents of the package; and
a third computer programmed to store the package for subsequent potential validation.

The first, second and/or third computers may be the same computer.

The apparatus may be operable to package the evidence whilst a certificate covering the digital or electronic data is valid. The apparatus may be operable to validate the digital evidence after expiry of a certificate covering the digital or electronic signature.

The first, second and/or third computers may be independent from each other.

According to a fourth aspect of the present invention a recordable medium is recorded with a computer program operable to perform the method of the first aspect.

All of the features disclosed herein may be combined with any of the above aspects, in any combination.

BRIEF DESCRIPTION OF THE DRAWINGS

Specific embodiments of the present invention will now be described, by way of example, and with reference to the accompanying drawings in which.

DETAILED DESCRIPTION OF THE INVENTION

In its simplest form a method for packaging digital evidence for long term validation is to form a package of a digital document together with evidence of the authority of a signature in the document and a time stamp indicating when the document was digitally signed. All of these pieces forming parts of the packaged evidence.

A digital time stamp is similar to a digital certificate in that it is provided by a third party, which may be a notary service, similar to a certification authority (CA), which verifies the time and date and production of a particular time stamp. The time stamp is encrypted with public key cryptography, as described above. The time stamp may have its own chain of certification to a root time stamping authority, similar to that as described in relation to CAs. The time stamp may alternatively be any form of time authentication.

Figure 2:
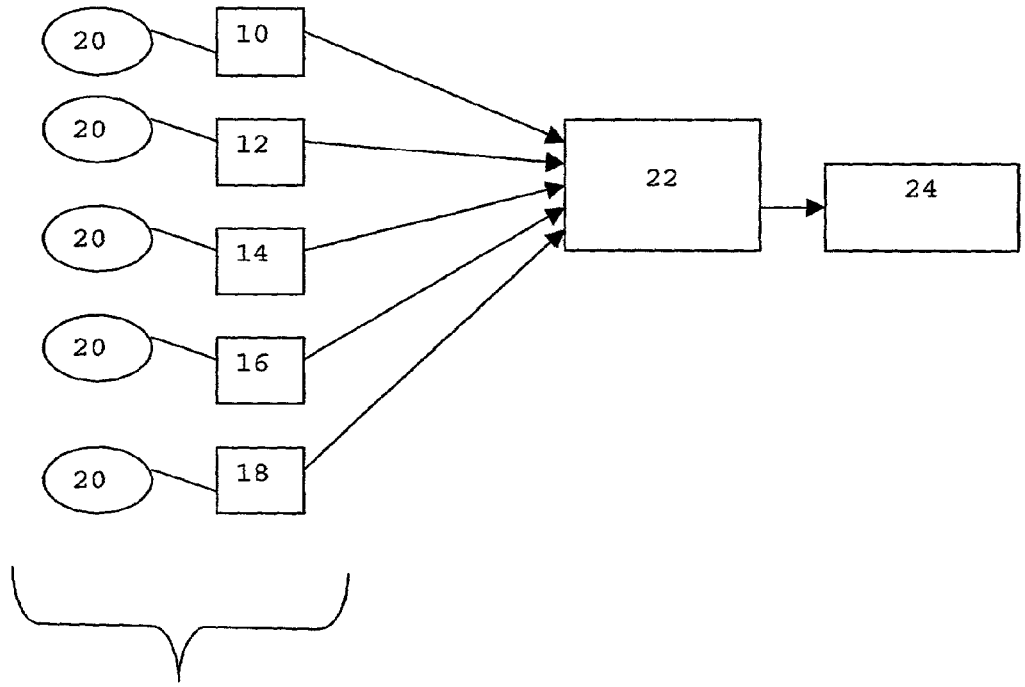
FIG. 2 is a schematic block diagram of a system for packaging evidence for long term validation

As shown in FIG. 2, the package of evidence 8 will include a document 10 for retention, a signature 12 for the document 10, a public key 14 associated with the signature (for verification of the signature), first evidence 16 of the owner/authority associated with the public key 14 used, second evidence 18 of the authority/trustworthiness of a time stamping service and a trusted time stamp 20 for each of the above from a time stamping service.

All of the elements of the package 8 can then be put into an evidence store 24, which could for instance be a computer database file.

In more detail, the standard such as public-key cryptography standards #7 (PKCS #7) entitled Cryptographic Message Syntax standard from RSA Laboratories can provide the framework for packaging signed data and is used as the underlying format for the method and system for packaging evidence described herein. PKCS 7 provides a framework which has the ability to have included in it a plurality of certificates and also certificate revocation lists (CRLs) which may be deemed relevant. A CRL is a list provided by a CA to indicate which certificates issued by the CA have been revoked. PKCS 7 does not have the facility for including a policy/usage statement of a certificate, as described below, to be included in the standard as it currently exists. However, suitable modifications can be made to PKCS 7 to allow for inclusion of such a statement.

Figure 1:
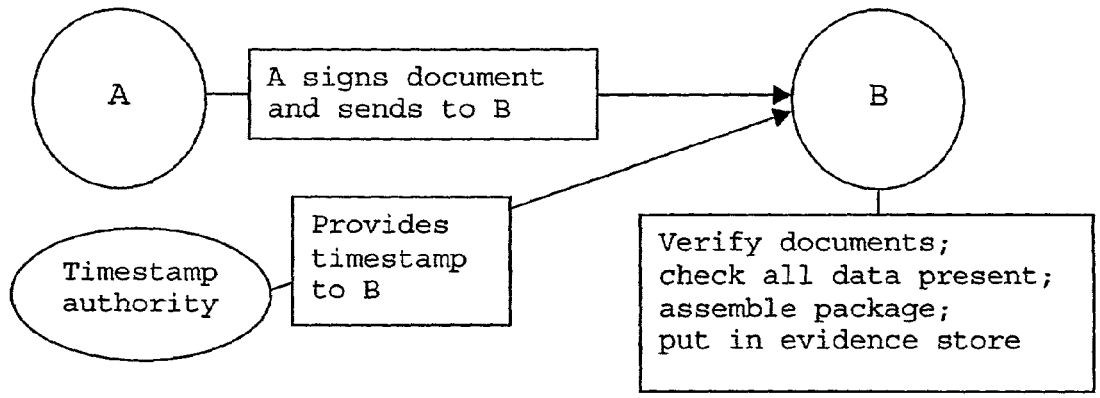
FIG. 1 is a schematic diagram showing the relationship between the signatories of a contract and the digital signing and storage thereof.

A package of evidence may be compiled as follows, as shown in relation to FIGS. 1 and 2.

A computer 22 is used to compile the package 8 by first receiving the document 10 signed by party A with his signature 12. Party B who is receiving the signed contract from A then runs a normal verification of the signature 12 by using the public key 14 which A provides with the signed document 10.

B then checks that all the data required in the contract is present. This data includes the first evidence 16 of the owner/authority associated with the key used, which, if appropriate, includes a chain of CAs to a root CA. B checks that the chain of CAs is acceptable before proceeding further. Associated with the chain of CAs is a policy statement of each certificate which sets out the terms and conditions for which a particular certificate is valid. Assuming that B is prepared to accept the first evidence 16, the computer 22 then goes on to check the second evidence 18.

The second evidence 18 includes, where appropriate, a chain of time stamp authorities and also a policy statement from the or each time stamping authority giving details of the effectiveness parameters of the verification of the time stamp given.

The various pieces of the package 8 are then assembled into a single computer file or collection of computer files or similar package and then placed in an evidence store 24, which in this example is a computer database.

Various modifications of the method and system described above are possible where there is some level of trust between A, the signatory of the document 10, and B, the party wishing to retain the document 10 as evidence.

Firstly, a third party notary service may be used to provide the necessary time stamping and packaging of the evidence on behalf of the signer A and the relier B. This time stamping and packaging is conducted for B and the package 8, having been verified and collated, is provided to B for storage by B. Alternatively, a notary service, potentially independent from the above mentioned notary service, may also provide storage of the evidence package 8.

The subsequent validation procedure is straightforward. The package is retrieved from the evidence store 24 and essentially the same steps carried out as are carried out in the verification step: the digital signature on the document is tested with the public key and the evidence of the associated CA is considered, and the timestamping evidence and the evidence of the associated timestamping authority is considered. The document is retrieved and validated if the digital signature and the timestamping evidence are considered satisfactory.

A further alternative would be to use the method and system described above in two parts. A may provide the signed document together with whatever information B requires such as time stamping and change of authority. B's decision on what information is required could be based on information which B already has in its evidence store 24.

For example, if B has evidence of a chain of authority already in its evidence store 24 which is identical to that of a new package of evidence 8 then he may decline that extra information in order to reduce his storage requirements. Such an example may be used where a lot of business is conducted between A and B. If this method is used, then it may be possible for B to reduce storage requirements for evidence by up to 80 or 90%. Consequently, there would be significant benefits achieved by arranging to have a negotiation procedure between A and B to set out what time stamping and authentication information is required. Once the negotiation has been conducted, then A can provide B with whatever B has specified. B would then package the information provided by A, together with references to other pieces of evidence in its evidence store 24 which, in this instance, validate what has been received on trust from A. B then places the reduced information package into its evidence store 24.

A further option would be in the situation where B trusts documents provided by A and he trusts A's time stamp, then A could produce and send a package to B for B to then check and store. In this situation, the time stamping authority used may provide to A all the authorities and chains of authority required for A to simply pass this on to B, B having taken on trust that the time stamping authority used by A is acceptable.

A modification of the negotiation procedure discussed above would be that party A simply provides all the various parts of the package 8 discussed above and sends the evidence package 8 to B for verification, which B can then check before storing in his evidence store 24.

The time stamping of the package 8 could either be conducted on each of the elements of the package or could be carried out on the package 8 as a whole. This issue is a completeness versus efficiency issue. Time stamping the whole package 8 provides completeness, because all the evidence is validated at the same time. However, if the same signature and/or time stamping service is regularly used, it will be more efficient to regularly create time stamps of the authority of the signature and the time stamp, with the ability to be able to produce these in association with the evidence package 8. The latter is more time efficient, but could be more open to a lack of trust between parties not familiar with each other's method of working.

Legitimately signed policy statements and certificates and time stamping certificates are included in the package (which is itself time stamped) because verification of the certificates and time stamps at a much later date is allowed by this method without recourse to the issuing service (e.g. CA) itself. Consequently, the fact that additional information is stored is disadvantageous, but the advantage of not needing to revert to the issuing service has considerable advantages for long term storage of evidence, because the issuing authority may have changed or be untraceable at a later date when verification of the evidence is required.

The method of packaging and system for packaging described above has significant advantages over previous methods and systems, because a single evidence package can itself be used to determine and provide evidence of when the package was signed and also to authenticate the signatures and time of signature for the package. Consequently, it is not necessary to have recourse to outside parties to validate the evidence. Also, the party wishing to retain the evidence has control of that evidence and so less reliance needs to be made on outside parties, unless a user wishes to put reliance on an outside party, at his discretion.

The invention claimed is:

1. A method of packaging digital evidence from a signatory for long term validation by a relier comprises:
    a third party independent from the signatory and the relier assembling a package for potential subsequent validation, said package comprising:
    a document for subsequent use;
    a digital or electronic signature for said document;
    a public key associated with the signature, for decryption thereof;
    evidence from a certification authority (CA) of the identity or authority of the signatory of the document;
    a time authentication for at least the document and the signature;
    and evidence from a time authentication authority validating the or each time authentication;
    the method also further comprising making the contents of the package available for verification; and making the package available for storage for subsequent potential use.

2. A method as claimed in claim 1, in which the evidence is packaged whilst a certificate covering said digital or electronic signature is valid.

3. A method as claimed in claim 1, in which the time authentication is a time stamp.

4. A method as claimed in claim 1, in which the evidence from the CA and/or evidence from the time authentication authority is included in the form of a reference to a location of that evidence.

5. A method as claimed in claim 4, in which the location of the evidence is in a data store in which the package is to be stored.

6. A method as claimed in claim 1, in which the evidence from the CA includes a certificate chain up to a trusted root CA.

7. A method as claimed in claim 1, in which a certificate revocation list (CRL) is also included in the package.

8. A method as claimed in claim 1, in which a policy statement for the or each certificate is also provided in the package.

9. A method as claimed in claim 1, in which the evidence from the time authentication authority includes a chain of authorities up to a root time authentication authority.

10. A method as claimed in claim 1, in which a CRL for the time authentications is also included in the package.

11. A method as claimed in claim 1, in which a policy statement for the or each CA or time authentication authority is also included in the package.

12. A method as claimed in claim 1, in which the time authentication is performed as one time authentication on the package as a whole.

13. A method as claimed in claim 1, in which the time authentication is performed on the specified items in the package individually.

14. A method as claimed in claim 1, in which a time authentication is also provided for the evidence from the CA.

15. A method as claimed in claim 1, further comprising verifying the contents of the package.

16. A method as claimed in claim 15, in which the package is verified by a fourth party, a verification client, which the relier uses to verify the package contents before storage.

17. A method as claimed in claim 15, in which the contents of the package are verified before expiry of a certificate covering said digital or electronic signature.

18. A method as claimed in claim 1, further comprising storing the package for subsequent potential use.

19. A method as claimed in claim 18, in which the package is stored in a data store.

20. A method of using a document with an associated digital signature after expiry of the digital signature, comprising:

retrieving from storage a package assembled for subsequent validation, said package comprising:
   a document for subsequent use; a digital signature for said document;
   a public key associated with the signature, for decryption thereof;
   evidence from a certification authority of the identity or authority of the signatory of the document;
   a time authentication for at least the document and the signature; and
   evidence from a time authentication authority validating the or each time authentication;
validating the package without reference to the certification authority; and
using the document.

21. Apparatus for the packaging of digital evidence comprises:
a first computer programmed to assemble a package for subsequent validation, said package comprising:
   a document for subsequent use;
   a digital or electronic signature for said document;
   a public key associated with the signature, for decryption thereof;
   evidence or a reference to an address of evidence from a certification authority (CA) of the identity or authority of the signatory of the document;
   a time authentication for at least the document and the signature; and
   evidence or a reference to an address of evidence from a time authentication authority validating the or each time authentication;
wherein the first computer is adapted to make the contents of the package available for verification, and to make the package available for storage.

22. Apparatus as claimed in claim 21, further comprising a second computer programmed to verify the contents of the package.

23. Apparatus as claimed in claim 22, further comprising a third computer programmed to store the package for subsequent potential validation.

24. Apparatus as claimed in claim 23, in which the first, second and/or third computers are the same computer.

25. Apparatus as claimed in claim 21, which is operable to package the evidence whilst a certificate covering said digital or electronic date is valid.

* * * * *